(12) United States Patent
Yoshida et al.

(10) Patent No.: US 11,056,257 B2
(45) Date of Patent: Jul. 6, 2021

(54) MAGNETIC COMPOUND AND ANTENNA

(71) Applicant: DOWA ELECTRONICS MATERIALS CO., LTD., Tokyo (JP)

(72) Inventors: Takayuki Yoshida, Tokyo (JP); Masahiro Gotoh, Tokyo (JP); Toshihiko Ueyama, Tokyo (JP); Takuyuki Baba, Tokyo (JP); Toru Suzuki, Chiba (JP); Koji Tanaka, Chiba (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 578 days.

(21) Appl. No.: 15/578,411

(22) PCT Filed: Jun. 1, 2016

(86) PCT No.: PCT/JP2016/066136
§ 371 (c)(1),
(2) Date: Nov. 30, 2017

(87) PCT Pub. No.: WO2016/194932
PCT Pub. Date: Dec. 8, 2016

(65) Prior Publication Data
US 2018/0218814 A1    Aug. 2, 2018

(30) Foreign Application Priority Data

Jun. 2, 2015   (JP) .............................. JP2015-112245

(51) Int. Cl.
| | |
|---|---|
| *H01F 1/26* | (2006.01) |
| *H01F 1/20* | (2006.01) |
| *H01F 1/28* | (2006.01) |
| *B22F 1/00* | (2006.01) |
| *C08K 3/08* | (2006.01) |
| *C08K 9/04* | (2006.01) |
| *C08L 81/02* | (2006.01) |
| *C08K 3/40* | (2006.01) |
| *C08K 7/14* | (2006.01) |

(52) U.S. Cl.
CPC ................ *H01F 1/20* (2013.01); *C08K 3/08* (2013.01); *C08K 3/40* (2013.01); *C08K 7/14* (2013.01); *C08K 9/04* (2013.01); *C08L 81/02* (2013.01); *H01F 1/26* (2013.01); C08K 2003/0843 (2013.01); C08K 2003/0856 (2013.01); C08K 2201/003 (2013.01); C08K 2201/004 (2013.01); C08K 2201/006 (2013.01); C08K 2201/01 (2013.01)

(58) Field of Classification Search
CPC ..... H01F 1/26; H01F 1/20; H01F 1/24; H01F 1/28; H01F 1/348; H01F 1/36; H01F 1/442; H01F 1/445; H01F 1/0054; H01F 1/083; C08K 3/08; C08K 9/04; C08K 2201/01; C08K 2003/0843; C08K 2003/0856; C08L 81/04; C08L 67/03; B22F 1/0062
USPC ......... 252/62.54, 62.55, 62.59, 62.63, 62.56, 252/62.62, 62.64
See application file for complete search history.

(56) References Cited

U.S. PATENT DOCUMENTS

| | | | | |
|---|---|---|---|---|
| 2003/0151030 | A1* | 8/2003 | Gurin ..................... | B82Y 10/00 252/502 |
| 2015/0175804 | A1* | 6/2015 | Aepli ...................... | C08K 3/24 428/35.7 |

FOREIGN PATENT DOCUMENTS

| | | |
|---|---|---|
| CN | 101699579 | 4/2010 |
| CN | 102504534 | 6/2012 |
| JP | S63153201 A | 6/1988 |
| JP | 2009105170 A | 5/2009 |
| JP | 2009155545 A * | 7/2009 |
| JP | 2009155545 A | 7/2009 |
| JP | 2011096923 A | 5/2011 |
| JP | 2013077802 A | 4/2013 |
| JP | 2013236021 A | 11/2013 |
| JP | 2014116332 A | 6/2014 |

OTHER PUBLICATIONS

Machine translation of JP-2009155545-A, 63 pages. (Year: 2009).*
International Search Report from PCT/JP2016/066136, dated Aug. 16, 2016.
International Preliminary Report on Patentability from PCT/JP2016/066136, dated Dec. 5, 2017.
Taiwanese Office Action for TW Application No. 105117362, dated Oct. 4, 2019.

* cited by examiner

*Primary Examiner* — Matthew E. Hoban
*Assistant Examiner* — Lynne Edmondson
(74) *Attorney, Agent, or Firm* — Greenblum & Bernstein, P.L.C.

(57) ABSTRACT

An object is to provide a magnetic compound excellent in high frequency properties and excellent in mechanical strength, and its related items, using the polyarylene sulfide resin, and to provide a technique regarding the magnetic compound having a metal magnetic powder and a polyarylene sulfide resin, and satisfying both mechanical strength and high frequency properties.

5 Claims, No Drawings

MAGNETIC COMPOUND AND ANTENNA

TECHNICAL FIELD

The present invention relates to a magnetic compound and an antenna.

DESCRIPTION OF RELATED ART

In recent years, in the field of electronic devices and communication devices, various materials have been developed successfully to meet various functions of the market. Among them, in the field of a device used for high-frequency regions and the like, a composite functional material affects the performance of a communication device, and therefore it is an important technical element.

For example, patent document 1 describes a magnetic composite material that also functions in the high frequency region. This magnetic composite material is formed by dispersing preferably, magnetic metal particles each having an acicular shape with an aspect ratio (major axis length/minor axis length) of 1.5 to 20, for example, in a dielectric material such as polyarylene ether resin or polyethylene resin (see paragraph [0025], claims 1 and 2 of patent document 1).

Patent document 1 also describes as follows: by using the above constitution, the magnetic composite material is suitably used for high frequency electronic components to be installed in electronic devices and communication devices used in the high frequency region of the GHz band, and by using predetermined acicular metal particles, predetermined magnetic properties can be provided regardless of whether or not the magnetic metal particles are oriented in the dielectric material (see paragraphs [0024], [0029] of patent document 1).

Further, patent document 2 describes a composite magnetic material that can be used for a small antenna that can be used in a wide band. This composite magnetic material is obtained by being dispersed in an insulating material. This composite magnetic material is a substantially spherical powder containing a soft magnetic metal, with its average particle diameter $D_{50}$ of 0.1 to 3 μm and, having a crystallite with an average crystallite diameter of 2 to 100 nm in the particle, and various resins are described as insulating materials (see paragraphs [0018] to [0021] of patent document 2).

For example, in the examples, an antenna is manufactured by mixing a magnetic powder, a thermoplastic PC/ABS resin, a solvent and the like (see paragraph [0069] of patent document 2). In this antenna, tan δ ε at a frequency of 2 GHz is less than 0.01 and a volume ratio of the magnetic powder to the total volume is 2 to 50 vol %, so that miniaturization is achieved (see paragraphs [0031] to [0032] of patent document 2).

Patent document 3 describes as follows: by using metal magnetic powder, a loss factor in the GHz band in inductors, antennas, and the like, can be suppressed to be low.

In a magnetic component obtained by molding a soft magnetic metal powder containing iron as a main component, which is a metal powder in which an average particle size is 100 nm or less, an axial ratio (major axis length/minor axis length) is 1.5 or more, a coercive force (Hc) is 39.8 to 198.9 kA/m (500 to 2500 Oe), and a saturation magnetization is 100 Am$^2$/kg or more, a loss factor in the kHz to GHz band can be kept low (see paragraphs [0011] to [0026] of patent document 3).

Patent document 4 describes a bonded magnet having heat resistance, in which the content ratio of the magnetic powder in a magnetic compound containing a magnet powder, polyphenylene sulfide (PPS) resin, and polyamide (PA) resin, is 79 to 94.5 wt %, the content ratio of the PPS resin is 5 to 20 wt %, and the content ratio of the PA resin is 0.1 to 2 wt % (see claim 1 of patent document 4).

PRIOR ART DOCUMENT

Patent Document

[Patent Document 1] Japanese Unexamined Patent Publication No. 2014-116332
[Patent Document 2] Japanese Unexamined Patent Publication No. 2011-096923
[Patent Document 3] Japanese Unexamined Patent Application Publication No. 2013-236021
[Patent Document 4] Japanese Unexamined Patent Publication No. 2013-077802

SUMMARY OF THE INVENTION

Problem to be Solved by the Invention

The magnetic compound prepared by kneading a magnetic material and a resin material or the like have been desired to improve their properties in accordance with a demand for higher performance of electronic devices, and on the other hand, improvement of mechanical strength is also demanded from a request for miniaturization.

Patent documents 1 to 4 disclose a magnetic compound of a magnetic material and a resin material (composite magnetic material), which has a high content ratio of the magnetic material.

On the other hand, along with an improvement of high-frequency properties of a metal magnetic powder that can be achieved by an applicant's investigation, sufficient high frequency properties have been obtained even if the content of the metal magnetic powder in the magnetic compound is reduced to some extent. However, when such a high-performance metal magnetic powder is dispersed in a resin, it is found that ignition occurs in a kneading stage or a strength of the resin is remarkably deteriorated as compared with a case that the metal magnetic powder is not added. Namely, the magnetic compound material that satisfies both mechanical strength and high frequency properties has not yet been obtained.

On the other hand, along with miniaturization of electronic devices and communication devices, and in order to withstand thin lines, correspond to flexible boards, and withstand interference with other components, a material having better bending strength and toughness has been desired.

For example, although patent document 1 exemplifies various resins as being usable, polyethylene resin shown as an example has a weak bending strength of about 6.9 MPa even with a high density having a relatively high mechanical strength, and therefore it is difficult to be used in a real environment where shocks are easily added.

Therefore, it is found by the inventors of the present invention, that improvement of mechanical strength can be expected by using polyarylene sulfide resin typified by polyphenylene sulfide resin as the resin.

However, patent document 4 describes as follows: other unexpected effect sometimes occurs during kneading and molding due to poor wettability of the polyphenylene sulfide resin and the magnetic powder. It is also confirmed that polyarylene sulfide resin typified by polyphenylene sulfide resin is excellent in high frequency property, but kneading with metal magnetic powders is difficult.

As described above, there are several proposals and disclosures about a magnetic compound (magnetic composite) constituted by metal magnetic particles and resin. However, in the magnetic compound constituted by a magnetic material and a resin material, magnetic particles are fine particles of an inorganic compound, and the resin is a polymer compound. That is, the magnetic compound and the resin have completely different chemical properties and physical properties, respectively. Therefore, it is difficult to predict what kind of properties the magnetic compound will exhibit, and for example, various trial and error are required as in the prior art.

Under the abovementioned circumstance, the present invention is provided, and an object of the present invention is to provide a magnetic compound excellent in high frequency properties and excellent in mechanical strength, and to provide an antenna constituted by the magnetic compound, using a metal magnetic powder and a polyarylene sulfide resin typified by a polyphenylene sulfide resin.

Means for Solving the Problem

According to a knowledge of the inventors of the present invention, when an antenna is constituted by a magnetic compound in which metal magnetic powder is mixed in resin, the antenna itself can be miniaturized due to wavelength shortening effect, thereby further contributing to miniaturization of portable devices and smartphones. However, it is found that the study has been limited to those related to metal magnetic materials in the past, although the magnetic metal powder is mixed with the resin as the magnetic compound constituting the antenna (for example, see patent document 1). In contrast, the inventors of the present invention study and achieve a new concept of the resin capable of exhibiting a function of mixing metal magnetic powder therein.

First, as a resin that can be a candidate for mixture, it is important to select a resin which is excellent in mechanical properties (particularly bending strength) and has a small loss in itself. However, the inventors of the present invention attempts to mix the metal magnetic powder disclosed in patent document 3 into a resin considered to be a candidate, and obtains a knowledge that burning is caused by ignition of the powder.

Here, a method of sealing the metal magnetic powder with a resin by increasing the ratio of the resin in the magnetic compound to thereby prevent ignition, is taken into consideration. However, in this method, it is a matter of course that the content of the metal magnetic powder is decreased, and a permeability of the magnetic compound itself is decreased. As a result, it is considered that the antenna constituted by the magnetic compound is probably not operated satisfactorily.

After continued research by the inventors of the present invention, it is found that there is a polyarylene sulfide resin as a resin exhibiting a function of mixing metal magnetic powder therein, excellent in mechanical properties (particularly bending strength) and has a small loss in itself. Further, the inventors of the present invention obtain an innovative knowledge that an ignition phenomenon can be avoided by coating at least a part of a surface of the metal magnetic particle constituting the metal magnetic powder with phthalic acid or a derivative thereof to obtain a magnetic powder composite, which is then kneaded with polyarylene sulfide resin. Thus, the present invention is completed.

In the present invention, the "derivative" refers to a compound which has been modified to such an extent that it does not significantly alter a structure or properties of a parent body, the modification being introduction of functional groups, oxidation, reduction, substitution of atoms, wherein "substitution of atoms" is based on a concept that a substance whose end is substituted with an alkali metal and which is made soluble.

Namely, in order to solve the abovementioned problem, a first invention is a magnetic compound, including:

a magnetic powder composite in which at least a part of a surface of a metal magnetic powder is coated with at least one of phthalic acid or a derivative thereof; and polyarylene sulfide resin.

A second invention is the magnetic compound of the first invention, wherein when the magnetic compound is constituted so that a content of the metal magnetic powder in the magnetic compound is 27.5 vol %, a real part $\mu'$ of permeability at a measuring frequency of 2 GHz is 1.5 or more, and tan $\delta\mu$ and tan $\delta\varepsilon$ are 0.05 or less.

A third invention is an antenna constituted by the magnetic compound of the first or second invention.

Advantage of the Invention

The present invention provides a magnetic compound containing a metal magnetic powder and a polyarylene sulfide resin, excellent in high frequency properties and excellent in mechanical strength, and provides an antenna constituted by the magnetic compound and excellent in high frequency properties and excellent in mechanical strength.

DETAILED DESCRIPTION OF THE INVENTION

The present invention provides a magnetic compound configured so that a content of a metal magnetic powder is 27.5 vol % and having properties in which real part $\mu'$ of a magnetic permeability at a measurement frequency 2 GHz is 1.5 or more and tan $\delta\mu$ and tan $\delta\varepsilon$ are 0.05 or less.

Further, the present invention provides an antenna constituted using the magnetic compound, and an electronic device including the antenna constituted by the magnetic compound.

The magnetic compound is obtained by mixing the metal magnetic powder and phthalic acid or its derivative to thereby form a magnetic powder composite, which is then melt-kneaded with a polyarylene sulfide resin.

In the magnetic compound, even if simply increasing an amount of resin, the content of the metal magnetic powder is decreased, and therefore there is a possibility that the properties of the antenna and the like may be adversely affected. Accordingly, regarding a blending amount of the resin, it is appropriate that it is not too much and not too small. Based on the knowledge obtained by the inventors of the present invention, it is possible to "prepare a magnetic compound with an increased amount of prescribed resin" and "constitute the magnetic compound only by the metal magnetic powder and the prescribed resin".

Namely, by providing a constitution of "the metal magnetic powder, the prescribed resin, or either of phthalic acid or a derivative thereof that contributes to the metal magnetic powder and the resin", it becomes possible for the first time to make the blending amount of the resin in the magnetic compound equal to or more than a predetermined value and to generate the magnetic compound containing the metal magnetic powder and the prescribed resin as the main component.

Embodiments of the present invention will be described hereafter in the following order.
<1. Magnetic compound>
  1-1. Metal magnetic powder
  1-2. Magnetic powder composite
  1-3. Resin
  (Method for producing polyarylene sulfide resin)
  (Filler and other additive)
<2. Method for producing the magnetic compound>
  2-1. Preparing step
  2-2. Coating step (surface treatment)
  (BET specific surface area)
  (Evaluation of magnetic properties of magnetic powder composite)
  (Measurement of TAP density)
  2-3. Kneading step with resin
  (Evaluation of physical properties of the magnetic compound)
  (Method for measuring a bending strength of a molded body)
<3. Modified example, etc.>
  (Metal magnetic powder and phthalic acid and the like and resin)
  (Application)

In the present invention, "to" means that it is a continuous range that is not less than a predetermined value and not more than a predetermined value.

1. Magnetic Compound

The magnetic compound according to this embodiment contains a magnetic powder composite and a polyarylene sulfide resin as main components.

Then, the magnetic powder composite is a powder containing a composite of phthalic acid or a derivative thereof and a metal magnetic powder, and is a powder in which phthalic acid or the derivative thereof is formed as a coating layer on at least a part of the surface of the metal magnetic powder.

Each constitution will be described hereafter.
1-1. Metal Magnetic Powder

The metal magnetic powder in this embodiment has the following constitution as an example.

The metal magnetic powder having appropriately designed magnetic properties, particle diameter and the like may be used.

As magnetic properties, permeability and a dielectric constant of the magnetic compound can be set by saturation magnetization (as). In addition, coercive force (Hc), squareness ratio (SQ), etc., as magnetic properties, and a particle size, a shape, BET (specific surface area), and TAP (density), etc., as powder properties, may be adjusted.

For example, the metal magnetic powder includes Fe (iron) or Fe and Co (cobalt) with rare earth elements, (which is a concept of including Y (yttrium) in the present invention). Further, at least one selected from Al (aluminum), Si (silicon), and Mg (magnesium) (hereinafter referred to as "Al or the like") can be contained if desired.

In addition, the metal magnetic powder of this embodiment can control the axial ratio (=major axis length/minor axis length) of the finally obtained metal particles, by controlling the content of a rare earth element in an aqueous solution containing an element as a raw material used in the production step.

Further, in the metal magnetic powder of this embodiment, when the content of the rare earth element is small, the axial ratio becomes large, a metal powder with low loss can be obtained. In this case as well, when the rare earth element content is larger than the predetermined amount, permeability can be secured. On the other hand, when the rare earth element content is large, the axial ratio becomes small and the loss becomes somewhat large, but the magnetic permeability becomes larger as compared with a case that rare earth element is not contained.

Namely, in the metal magnetic powder of this embodiment, it is possible to achieve low loss and high permeability by setting an appropriate rare earth content. As a result, it is possible to obtain the metal magnetic powder which can be used in a wide range such as a conventional kHz to GHz band.

Here, as described above, the specific content range of an appropriate element for maintaining a balance of properties is set so that the content of the rare earth element with respect to the sum of Fe and Co is preferably 0 at % (preferably more than 0 at %) to 10 at %, and more preferably more than 0 at % and 5 at % or less. Further, Y and La are preferable as the rare earth element species to be used.

When the metal magnetic powder in this embodiment contains Co, Co content is preferably set as 0 to 60 at % as a ratio of Co to Fe (hereinafter referred to as "Co/Fe atomic ratio") in terms of atomic ratio. Further, the Co/Fe atomic ratio is preferably 5 to 55 at %, and the Co/Fe atomic ratio is more preferably 10 to 50 at %. In such a Co/Fe atomic ratio range, the metal magnetic powder in this embodiment has a high saturation magnetization and a stable magnetic property can be easily obtained.

On the other hand, in the metal magnetic powder in this embodiment, Al or the like also has a sintering suppressing effect, thereby exhibiting an effect of suppressing a coarsening of particles due to sintering during heat treatment. In the present invention, A or the like is treated as one of "sintering suppressing elements". However, Al or the like is a nonmagnetic component, and therefore from a viewpoint of sufficiently securing the magnetic properties of the metal magnetic powder, the content of Al or the like relative to the sum of Fe and Co is preferably 1 at % to 20 at %, more preferably 3 at % to 18 at %, and still more preferably 5 at % to 15 at %.

Further, the metal magnetic powder in this embodiment preferably has a core/shell structure composed of a core made of a metal component and a shell mainly composed of an oxide component.

Whether or not the metal magnetic powder has the core/shell structure can be confirmed by, for example, a TEM photograph. Further, a composition analysis of the metal magnetic powder can be performed by methods such as ICP emission spectrometry, ESCA (aka XPS), TEM-EDX, SIMS and the like.

An average primary particle size of the metal magnetic powder in this embodiment is preferably a nanoparticle in a range of 10 nm or more and 500 nm or less, and more preferably 100 nm or less. Although the metal magnetic powder having a micro level (μm) can be used, a smaller particle size is preferable from a viewpoint of improving communication characteristics and miniaturization.

An average primary particle size of the metal magnetic powder in this embodiment can be measured by a transmission electron microscope. Specifically, for example, the average primary particle size can be obtained as follows: a photograph with a magnification of 10,000 times or more is taken using a transmission electron microscope (JEM-100CXMark-II type, JEOL Ltd.), and the picture of an enlarged particle group is obtained by enlarging the photograph, and thereafter 400 particles or more are randomly selected to measure the particle size of an individual particle, and the average value thereof is calculated.

It is preferable to adjust the blending so that the content of the metal magnetic powder in the magnetic compound in this embodiment is 50 vol % or less, preferably 40 vol % or less, and more preferably 35 vol % or less. This is because an elastic modulus can be improved without impairing the bending strength of the resin while obtaining desired excellent communication characteristics.

1-2. Magnetic Powder Composite

The magnetic powder composite of this embodiment can be obtained by coating the surface of the metal magnetic powder with phthalic acid or a derivative thereof (hereinafter sometimes simply referred to as "phthalic acid or the like") in a surface treatment step described later. As a result, it can be considered that the phthaic acid, etc., adheres to the whole or at least a part of the surface of the metal magnetic powder, to thereby form the magnetic powder composite in this embodiment.

The term "derivative" as used herein refers to a compound which has been modified to such an extent that it does not significantly alter a structure or properties of a parent body, the modification being introduction of functional groups, oxidation, reduction, substitution of atoms, wherein "substitution of atoms" is a concept including a case that a substance whose end is substituted with an alkali metal and which is made soluble.

A coating amount of phthaic acid, etc., in the magnetic powder composite is set so that the mass of carbon calculated as a carbon measurement value in the high frequency combustion method is preferably in a range of 0.1 wt % to 10 wt % with respect to a total weight of the magnetic powder composite. However, phthalic acid or the like, in addition to those which coat the surface of the particle of the metal magnetic powder in the magnetic compound, there is also a possibility that some of them are dispersed in the resin or some of them are combined with the resin.

Therefore, each desired property of the magnetic compound, can preferably be exerted by setting the amount of metal magnetic powder and the amount of resin.

Further, the content of the magnetic powder composite in the magnetic compound in this embodiment is not particularly limited as long as the effect of the present invention can be obtained. However, from a viewpoint of increasing the elastic modulus without impairing the bending strength of the resin while obtaining the desired excellent electrical and magnetic properties, the content of the magnetic powder composite in the magnetic compound is preferably from 35 to 80 wt %, more preferably from 40 to 75 wt %, and still more preferably from 45 to 70 wt %.

1-3. Resin

The polyarylene sulfide resin (hereinafter sometimes simply referred to as "resin") in this embodiment, has a resin structure having a structure in which an aromatic ring and a sulfur atom are bonded as a repeating unit. Specifically, the polyarylene sulfide resin is a resin having a structural site represented by the following formula (1) (wherein R1 and R2 each independently represent a hydrogen atom, an alkyl group having 1 to 4 carbon atoms, a nitro group, an amino group, a phenyl group, a methoxy group or an ethoxy group) as a repeating unit.

[Formula 1]

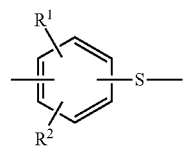

Formula (1)

Here, in the structural site represented by the formula (1), particularly, R1 and R2 in the formula are preferably hydrogen atoms from a viewpoint of the mechanical strength of the polyarylene sulfide resin, and in this case, those bonded at a para position represented by the following formula (2) and those bonded at a meta position represented by the following formula (3), can be given.

[Formula 2]

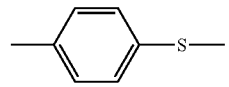

Formula (2)

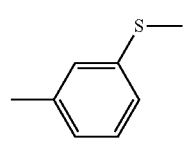

Formula (3)

Among them, it is preferable that the bond of the sulfur atom to the aromatic ring in the repeating unit is a structure bonded at the para position represented by the above formula (2), in terms of heat resistance and crystallinity of the polyarylene sulfide resin.

Further, the polyarylene sulfide resin may include not only the structural site represented by the formula (1), but also the structural sites represented by the following formulas (4) to (7) in a range of 30 mol % or less based on a total of the structural sites represented by the formula (1).

[Formula 3]

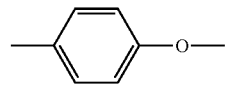

Formula (4)

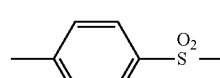

Formula (5)

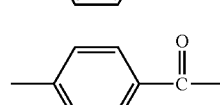

Formula (6)

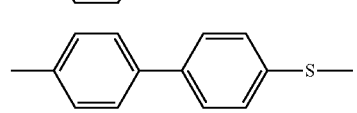

Formula (7)

In this embodiment, it is further preferable that the structural sites represented by the formulas (4) to (7) are in a range of 10 mol % or less, from a viewpoint of the heat resistance and the mechanical strength of the polyarylene sulfide resin. When the polyarylene sulfide resin includes the structural sites represented by the formulas (4) to (7), a bonding mode of them may be either a random copolymer or a block copolymer.

Further, the polyarylene sulfide resin may include a trifunctional structural site represented by the following formula (8) in its molecular structure, or a naphthylsulfide bond or the like, preferably in a range of 3 mol % or less, more preferably in a range of 1 mol % or less, based on a total number of moles with other structural sites.

[Formula 4]

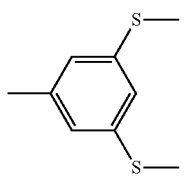

Formula (8)

Further, melt viscosity of the polyarylene sulfide resin in this embodiment is not particularly limited as long as the effect of this invention can be obtained. However, from a viewpoint of excellent moldabiilty, surface appearance and mechanical strength, the melt viscosity (V6) measured at 300° C. is preferably in a range of 2 to 1,000 [Pa·s], more preferably in a range of 2 to 150 [Pa·s], and most preferably in a range of 5 to 75 [Pa·s].

The melt viscosity (V6) measured at 300° C. refers to the melt viscosity after holding it for 6 minutes using a flow tester, at a temperature of 300° C., under a load of 1.96 MPa, using an orifice having an orifice length and an orifice diameter with the former/latter ratio being 10/1.

(Method for Producing Polyarylene Sulfide Resin)

An example of a method for producing a polyarylene sulfide resin will be described.

The method for producing the polyarylene sulfide resin is not particularly limited, but for example, 1) a method for polymerizing a dihalogenoaromatic compound and other copolymerization components if necessary in the presence of sulfur and sodium carbonate;

2) a method for causing a self-condensation of p-chlorothiophenol and other copolymerization components if necessary;

3) a method for causing a reaction between a sulfidizing agent and a dihalogenoaromatic compound, and other copolymerization components if necessary, in an organic polar solvent;

4) a method for causing a melt polymerization in the presence of a diiodoaromatic compound, elemental sulfur, and optionally a polymerization inhibitor and a polymerization catalyst, etc.

Among these methods, the method 3) is versatile and preferable. During the reaction, an alkali metal salt of a carboxylic acid or a sulfonic acid may be added or an alkali hydroxide may be added in order to adjust the degree of polymerization.

Among the above method it is preferable to use 3), a method for introducing a hydrous sulphidizing agent to a mixture comprising a heated organic polar solvent and a dihalogenoaromatic compound at a rate at which water can be removed from the reaction mixture; causing a reaction between a dihalogenoaromatic compound and a sulfidizing agent in an organic polar solvent; and producing a polyarylene sulfide resin by controlling the amount of water in a reaction system to be in a range of 0.02 to 0.5 mol per 1 mol of the organic polar solvent (See Japanese Unexamined Patent Publication No. 07-228699.), and a method for causing a reaction between a polyhaloaromatic compound, and an alkali metal hydrosulfide and an organic acid alkali metal salt in the presence of a solid alkali metal sulfide and an aprotic polar organic solvent, while controlling 0.01 to 0.9 mol of organic acid alkali metal salt per 1 mol of sulfur source and the water content in the reaction system within a range of 0.02 mol or less relative to 1 mol of aprotic polar organic solvent (see the pamphlet of WO 2010/058713.), to thereby obtain the polyarylene sulfide resin.

(Filler and Other Additive)

In order to improve performances such as strength, heat resistance, dimensional stability and the like within a range of exhibiting the effect of the present invention, a filler and other additives may be further contained in the magnetic compound in this embodiment in addition to the above components.

As the other additives, various additives such as a colorant, a heat stabilizer, an ultraviolet light stabilizer, a foaming agent, a rust preventive agent, a flame retardant, and a lubricant, can be given.

Further, a coupling agent can be used as an additive in this embodiment, and silane-based coupling agents and titanium-based coupling agents, etc. can be used. Among them, the silane coupling agents are preferable, and a silane coupling agent having a functional group which reacts with a carboxy group (for example, an epoxy group, an isocyanate group, an amino group or a hydroxyl group) is preferable. As such a silane coupling agent, for example, an epoxy group-containing alkoxysilane compound such as γ-glycidoxypropyltrimethoxysilane, γ-glycidoxypropyltriethoxysilane, β-(3,4-epoxycyclohexyl) ethyltrimethoxysilane, an isocyanate group-containing alkoxysilane compound such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, γ-isocyanatopropyltrichlorosilane, an amino group-containing alkoxysilane compound such as γ-(2-aminoethyl) aminopropylmethyldimethoxysilane, γ-(2-aminoethyl) aminopropyltrimethoxysilane, γ-aminopropyltrimethoxysilane, and a hydroxyl group-containing alkoxysilane compound such as γ-hydroxypropyltrimethoxysilane and γ-hydroxypropyltriethoxysilane, can be given.

Further, as the filler in this embodiment, the filler, etc., having various shapes such as granular shape and fibrous shape can be given, and for example fibrous fillers such as glass fiber, silane glass fiber, ceramic fiber, aramid fiber, fiber such as potassium titanate, silicon carbide, calcium sulfate, calcium silicate, natural fiber such as wollastonite, and barium sulfate, calcium sulfate, clay, pyrophyllite, bentonite, sericite, zeolite, mica, mica, talc, attapulgite, ferrite, calcium silicate, calcium carbonate, magnesium carbonate, glass beads etc., can be given.

The content of these fillers and various additives is varied depending on a purpose and cannot be unconditionally defined. However, such fillers and various additives may be appropriately adjusted and used according to the purpose and application so that the present invention can exhibit its effect, in a range of 0.01 to 1000 parts by mass based on 100 parts by mass of the polyarylene sulfide resin. These fillers and various additives can be used alone or in combination of two or more.

The magnetic compound in this embodiment includes the magnetic powder composite and the polyarylene sulfide resin, but a prescribed amount of another resin component can be added according to a purpose of use and the like and can be used as a melt-kneaded product, as long as the main component is polyarylene sulfide resin.

As the other resin component, synthetic resins such as polyester, polyamide, polyimide, polyether imide, polycarbonate, polyphenylene ether, polysulfone, polyether sulfone, polyether ether ketone, polyether ketone, polyarylene, polyethylene, polypropylene, polytetrafluoroethylene, polyvinyl fluoride ethylene, polystyrene, ABS resin, epoxy resin, silicone resin, phenol resin, urethane resin, liquid crystal polymer, or a resin such as an elastomer including fluororubber and silicone rubber, and particularly polyolefin elastomer having an epoxy group, an amino group, a carboxy group, an isocyanato group, or at least one functional group selected from a group consisting of a partial structure represented by the following structural formula (1), structural formula (2) (wherein R represents an alkyl group having 1 to 8 carbon atoms in structural formula (1), structural formula (2)), can be given.

[Formula 5]

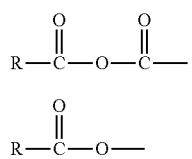

Structural formula (1)

Structural formula (2)

An addition amount of these other resin components is varied depending on the purpose, and it cannot be specified unconditionally. However, such other resin components may be appropriately adjusted and used according to the purpose and application so that the present invention can exhibit its effect, in a range of 0.01 to 10 parts by mass based on 100 parts by mass of the polyarylene sulfide resin. These other resin components can be used alone or in combination of two or more.

As the magnetic properties in the high-frequency (2 GHz) region of the magnetic compound (content of the metal magnetic powder in the magnetic compound corresponds to 27.5 vol %) in this embodiment, it is preferable that the real part $\mu'$ of the complex relative magnetic permeability is 1.50 or more, and preferably 1.70 or more. The magnetic compound having such properties has a high magnetic permeability, and therefore it can exhibit a sufficient miniaturization effect, and it is very useful for constituting an antenna with small return loss.

Further, the magnetic loss tan $\delta\mu$ ($=\mu''/\mu'$) and the dielectric loss tan $\delta\varepsilon$ ($=\varepsilon''/\varepsilon'$) in the high frequency (2 GHz) region of the magnetic compound in this embodiment, is preferably 0.10 or less, more preferably 0.05 or less, and still more preferably 0.02 or less.

2. Method for Producing Magnetic Compound

An example of a method for producing the magnetic compound in this embodiment will be described hereafter.
2-1. Preparation Step
In this step, various preparations for producing the magnetic compound are performed. For example, various raw materials such as the abovementioned metal magnetic powder, phthaic acid, etc., and resin to be mixed, are prepared.
2-2. Coating Step (Surface Treatment)
Phthaic acid, etc., is added to the metal magnetic powder and mixed to obtain a magnetic powder composite.

The ratio of adding phthaic acid, etc., to the metallic magnetic powder is not particularly limited as long as the effect of the present invention is exhibited. However, from a viewpoint of improving dispersibility of the magnetic particles in the resin and having excellent magnetic permeability, an amount of carbon in the magnetic powder composite calculated as a carbon measurement value obtained by a high frequency combustion method, is preferably 0.1 to 10 wt %, and more preferably 2 to 5 wt % based on the total amount of the magnetic powder composite.

In order to realize the addition ratio, it is preferable to add phthaic acid, etc., in 2 to 15 parts by mass, more preferably 2.5 to 10 parts by mass, and even more preferably 5 to 10 parts by mass, based on 100 parts by mass of the metal magnetic powder in the production step.

When phthaic acid, etc., is added in an amount of 2 parts by mass or more based on 100 parts by mass of the metal magnetic powder, wettability between the magnetic powder composite and the resin is improved and affinity between them is excellent. As a result, property stability of the product is improved when it is produced, which is preferable.

In contrast, when phthaic acid, etc., is added in an amount of 15 parts by mass or less based on 100 parts by mass of the metal magnetic powder, an amount of a non-magnetic component in the magnetic powder composite is an appropriate amount, and deterioration of magnetic properties of the magnetic powder composite itself can be avoided. As a result, it is possible to keep the high-frequency properties relatively high when the magnetic powder composite is mixed in the resin to form a magnetic compound. Then, the properties of the finally formed antenna are also preferable because they can be kept good as well.

A solvent to be added when the magnetic powder composite is obtained by adding phthaic acid, etc., to the metal magnetic powder (a solvent to be added for further improving the affinity between the metal magnetic powder and phthalic acid etc.), is not necessarily required to completely dissolve phthaic acid, etc.

It is preferable to adopt a method of adding the metal magnetic powder to a mixed solution of phthaic acid, etc.; impregnating the metal magnetic powder in the mixed solution, and thereafter removing the solvent from the mixed solution.

It is also preferable to adopt a method of adding the metal magnetic powder to the solution of phthaic acid, etc., and stirring it with a rotation/revolution combination type stirrer or stirring while adding a shearing force, to thereby form a paste. Through a pasting process, phthaic acid, etc., and the metal magnetic powder are well mixed, with excellent affinity between them. Thereby, phthaic acid, etc., is more easily adsorbed on the surface of the metal magnetic powder, and it becomes easy to form the magnetic powder composite. There is no problem as long as the phthaic acid, etc., evenly added to the metal magnetic powder is evenly spread. In addition, there is no problem in using a mixer or the like for removing and drying the solvent during kneading. After removing and drying the solvent, it is essential that phthaic acid, etc., is remained on the surface of the particle of the metal magnetic powder.

Further, it is necessary to form the magnetic powder composite while efficiently generating contact between the metal magnetic powder and phthaic acid, etc., and therefore a disperser and a kneader having a high shearing force may be used, or the metal magnetic powder may be dispersed in the solvent while adding a strong shearing force to the solvent.

As the disperser having a strong shearing force which is used when adopting a method for drying the magnetic powder composite in a powder state after production, T. K. Homomixer (registered trademark) known as a turbine-stator type stirrer manufactured by Primix Corporation, and Ultra-Turrax (registered trademark) manufactured by IKA Corporation, etc., can be exemplified, and as the colloid mill, T. K. Mycolloider (registered trademark), T. K. Homomic line mill (registered trademark), and T.K. High line mill (registered trademark) manufactured by Primics Corporation, and Static mixer (registered trademark), high pressure microreactor (registered trademark), and high pressure homogenizer (registered trademark), etc., manufactured by NORITAKE COMPANY LIMITED, can be preferably exemplified.

The strength of the shearing force can be evaluated by a blade circumferential speed of a stirring blade, in a case of an apparatus having a stirring blade. In this embodiment, "Strong shearing force" means that the blade circumferential speed is preferably in a range of 3.0 (m/s) or more, and more preferably 5.0 (m/s) or more. When the blade circumferential speed is the above value or more, the shearing force is moderately high, the time for preparing the magnetic powder composite can be shortened, and the production efficiency is moderately good. However, when reduction of damage to the metal magnetic powder is taken into consideration, it is also possible to reduce the damage by adjusting the blade circumferential speed to be low.

The blade circumferential speed can be calculated by the following formula: circular constant×diameter of turbine blade (m)×stirring rotation number per second (rotation number). For example, if a diameter of the turbine blade is 3.0 cm (0.03 m) and the stirring rotation number is 8000 rpm, the stirring rotation number per second is 133.3 (rps), and the blade circumferential speed is 12.57 (m/s).

It is preferable to remove the solvent by drying the obtained paste-like magnetic powder composite. At this time, the paste can be spread on a vat and dried at a temperature equal to or higher than a drying temperature of the solvent and lower than a decomposition temperature of a coating material. For example, when a coating process is performed to a substance that is easily oxidized, drying of the solvent can be performed under an inert atmosphere or in a nitrogen atmosphere in view of a cost.

Further, as a method for producing the magnetic powder composite, for example, filtration may be performed to remove a certain amount of solvent, followed by drying, when the metal magnetic powder is coated with phthaic acid, etc., using the solvent. Thus, the content of the solvent can be reduced in advance, and the drying time can also be shortened. In order to confirm whether the coating is firm or not, for example, it is possible to evaluate how much a residual component is remained, by evaporating the filtrate.

The magnetic powder composite thus obtained is preferably classified using a classifier or a sieve. This is because by removing excessively large coarse particles, it is preferably possible to avoid a situation in which a force is added on a certain portion of the coarse particles at the time of preparing the antenna, thereby deteriorating mechanical properties. Accordingly, by classifying into uniform particle size, the mechanical properties of a molded body are improved and occurrence of cracks can be suppressed, which is a preferable configuration. When classifying is performed using a sieve, it is preferable to use a mesh with an opening of 500 mesh or less.

The properties and composition of the magnetic powder composite obtained through the above steps are confirmed by the following method.

(BET Specific Surface Area)

A BET specific surface area is obtained by a BET one-point method using 4 SOURVE US manufactured by Yuasa Ionics Co., Ltd.

(Evaluation of Magnetic Properties of the Magnetic Powder Composite)

As magnetic properties (bulk properties) of the obtained magnetic powder composite (or metal magnetic powder), coercive force Hc (Oe or kA/m), saturation magnetization σs (Am$^2$/kg), squareness ratio SQ, and coercive force distribution SFD can be measured in an external magnetic field of 10 kOe (795.8 kA/m), using a VSM apparatus (VSM-7P) manufactured by Toei Industry Co., Ltd. Δσs is a percentage (%) of a reduction rate of the saturation magnetization when the magnetic powder is allowed to stand in a hot and humid environment of 60° C. and 90% for one week.

(Measurement of TAP Density)

TAP density can be measured according to a method of JIS K-5101: 1991.

2-3. Kneading Step with Resin

The obtained magnetic powder composite and the above-mentioned resin are melt-kneaded to thereby form a magnetic compound.

In the melt-kneading step, the magnetic powder composite is mixed and dispersed in the resin. In a state after kneading, it is desirable that the magnetic powder composite is dispersed in the resin with a uniform concentration. When the amount of the magnetic powder composite that can be mixed in the resin is large, the magnetic permeability becomes particularly high when high frequency is added thereto, and on the other hand, mechanical properties of the resin are deteriorated in some cases. Therefore, it is preferable to consider an addition amount of the magnetic powder composite in consideration of a balance between the mechanical properties and the high frequency properties of the magnetic compound.

The method for producing the magnetic compound in this embodiment is not particularly limited as long as the effect of the present invention is exhibited. For example, there is a method for uniformly mixing a magnetic powder composite material as a raw material and polyarylene sulfide resin using a tumbler or a Henschel mixer, and subsequently melt-kneading the mixture using a Banbury mixer, a mixing roll, a uniaxial or biaxial extruder, a kneader or the like. Among them, the method for melt-kneading the mixture using the uniaxial or biaxial extruder having sufficient kneading power is preferable.

Specifically, there is a method for further uniformly mixing the magnetic powder composite and the polyarylene sulfide resin, with other fillers and additive components if necessary, using a tumbler or a Henschel mixer, and subsequently charging the mixture into the biaxial extruder, and melt-kneading the mixture under a condition that the ratio (discharge amount/screw rotation number) of a discharge amount (kg/hr) of the resin component and the screw rotation number (rpm) is 0.02 to 2 (kg/hr/rpm). Under such a condition, it is possible to form a morphology in which the magnetic powder composite is dispersed, using the polyarylene sulfide resin as a matrix (continuous phase).

When the above production method is described in more detail, it is preferable to adopt a method for charging the abovementioned each component into an extruder and melt-kneading the mixture under a temperature condition of a set temperature of 300 to 340° C. and a resin temperature of about 320 to 360° C., and more preferably the set temperature of 310 to 330° C. and the resin temperature of 330 to 350° C. from a viewpoint of suppressing thermal deterioration and dispersibility of the magnetic powder composite. In this case, the discharge amount of the resin component is preferably in a range of 4 to 400 kg/hr at a rotation speed of 200 rpm, and more preferably 10 to 250 kg/hr from a viewpoint of dispersibility. Accordingly, the ratio (discharge amount/screw rotation number) of the discharge amount (kg/hr) of the resin component and the screw rotation speed (rpm) is particularly preferably 0.05 to 1.25 (kg/hr/rpm).

Further, when other blending components such as a filler and additives are added, they are preferably charged from a side feeder of the extruder into the extruder from a viewpoint of improving dispersibility.

The magnetic compound thus melt-kneaded is thereafter directly molded into a molded body using various known molding methods, or once formed as a pellet, which is then melt-molded by various molding machines, and can be molded into a target molded body. As known molding methods, an injection molding method, a press molding method, a calender molding method, a roll molding method, an extrusion molding method, a cast molding method, a blow molding method, and the like, can be given.

(Evaluation of Properties of the Magnetic Compound)

0.2 g of the magnetic compound obtained by the abovementioned method is placed in a donut-shaped container, and a molded body of a magnetic compound having an outer diameter of 7 mm and an inner diameter of 3 mm and having a toroidal shape is formed, using a hand press machine or a hot press machine. Thereafter, a network analyzer (E8362C) manufactured by Agilent Technologies, Ltd. and Coaxial S parameter method sample holder kit manufactured by Kanto Electronic Applied Development Co., Ltd. (product model number: CSH 2-APC 7, sample size: φ 7.0 mm–φ 3.04 mm×5 mm) are used, to thereby measure the high-frequency properties of the molded product of the obtained magnetic compound at intervals of 0.5 to 5 GHz, with a measurement width at intervals of 0.05 GHz, and by measuring the real part ($\mu'$) of permeability, the imaginary part ($\mu''$) of permeability, the real part ($\epsilon'$) of dielectric constant and the imaginary part ($\epsilon''$) of dielectric constant, the high frequency properties can be confirmed. Wherein, calculation is performed, based on tan $\delta\epsilon = \epsilon''/\epsilon'$, and tan $\delta\mu = \mu''/\mu'$.

(Method for Measuring Bending Strength of the Molded Product)

In order to measure the bending strength of the molded product, a test piece was produced by injection molding. A dumbbell having a length of 80 mm, a thickness of 1 mm, and a width of 5 mm in a parallel portion was molded as a test piece.

The bending strength may be measured using the above test piece, according to JIS-K 7171 "Method for testing plastic-bending property".

As described above, according to this embodiment, it is found that a magnetic compound can be provided, which is excellent in high frequency properties and excellent in mechanical strength and its related items, using the polyarylene sulfide resin.

3. Modified Example, Etc.

The technical scope of the present invention is not limited to the abovementioned embodiments and includes various modifications and improvements within the scope of deriving specific effects obtained by the constituent features of the invention and combinations thereof.

(Metal Magnetic Powder, Phthalic Acid, Etc., and Resin)

This embodiment describes in detail: the main elements and compounds concerning metal magnetic powder, phthalic acid, etc., and resin. On the other hand, metal magnetic powder, phthalic acid, etc., and resin may contain substances other than the abovementioned elements and compounds, as long as the effect of the present invention is not impaired.

(Application)

The magnetic compound in this embodiment can be used for an antenna, an inductor, and a radio wave shielding material. Particularly, in the antenna composed of the magnetic compound, and further, in an electronic communication device (electronic device) including the antenna, it is possible to enjoy relatively high communication characteristics as shown in the items of the embodiments described later.

As such an electronic communication device, for example, a device having a unit that functions as an electronic communication device based on a radio wave received by the antenna in this embodiment and a control unit that controls the above unit based on the received radio wave, can be given.

The electronic communication device in this embodiment is preferably a communication device having a communication function in view of having the antenna. However, an electronic device that does not have a communication function such as calling may be used as long as it is an electronic device that receives a radio wave by an antenna and exercises its function.

EXAMPLES

The present invention will be specifically described hereafter, with reference to examples. It is a matter of course that the present invention is not limited to the following examples.

The blanks in each table are items that have not been measured or can not be measured.

Example 1

First, ethanol (special grade reagent manufactured by Wako Pure Chemical Industries, Ltd.) was added so as to be 500 g as a solvent to 25 g of phthalic acid (special grade reagent manufactured by Wako Pure Chemical Industries, Ltd.), and phthalic acid was dissolved in ethanol. 500 g of metal magnetic powder (Iron-cobalt metal particles, major axis length: 40 nm, coercive force Hc 757 (Oe) or 60 (kA/m), saturation magnetization σs 179.3 (Am$^2$/kg), squareness ratio SQ: 0.337, coercive force distribution SFD 3.141, Δσs 7.6(%), BET: 37.3 m$^2$/g, and carbon atomic weight (high frequency combustion method): 0.01 wt %, manufactured by Dowa Electronics Co.,) was added to the above solution in an inert atmosphere, and the metal magnetic powder was precipitated in the solution, which was then mixed in the atmosphere by a high-speed stirrer (TK Homomixer Mark II, manufactured by Primix Corporation) at 8000 rpm for 2 minutes by stirring to thereby obtain a paste state.

The obtained paste was spread on an aluminum vat, heated for 1 hour at a temperature near the evaporation temperature of ethanol (78° C.), then heated with temperature raised to 120° C. for 1.5 hours, and ethanol was removed from the paste to thereby obtain an aggregate in which phthalic acid and metal magnetic powder were mixed. The obtained aggregate was passed through a 500 mesh sieve (manufactured by Tokyo Screen Manufacturing Co., Ltd.) to remove coarse particles to thereby obtain a magnetic powder composite according to this example. The obtained magnetic powder composite had properties of BET: 34.9 $m^2/g$, σs: 173.5 $Am^2/kg$, and carbon content (high frequency combustion method): 2.82 wt %.

Production of the magnetic powder composite described above was repeated several times to thereby prepare an amount of magnetic powder composite required for melt-kneading as described below.

The obtained magnetic powder composite, polyphenylene sulfide resin ("DIC.PPS" V6 melt viscosity of 15 Pa·s manufactured by DIC Corporation) and fibrous reinforcing agent (glass fiber: fiber diameter 10 μm, fiber length 3 mm) were uniformly mixed using a tumbler so as to obtain the magnetic compound composition shown in table 1, and thus a blended material was obtained. Thereafter, the blended material was charged into a vented twin-screw extruder "TEX-30" manufactured by Japan Steel Works, Ltd., which was then melt-kneaded at a discharge rate of 15 kg/hr, a screw rotation speed of 200 rpm, and a set temperature of 320° C. to thereby obtain a magnetic compound pellet.

Example 2

In this example, the magnetic compound was produced in the same manner as example 1 except that an addition amount of the metal magnetic powder was changed to an amount corresponding to 24 vol %, and an addition amount of the polyphenylene sulfide resin and an addition amount of the fibrous reinforcement are adjusted.

Comparative Example 1

In this example, the magnetic compound was produced in the same manner as example 1, except that a metal magnetic powder not surface-treated with phthalic acid was used instead of the magnetic powder composite.

Comparative Example 2

In this example, it was confirmed whether effects similar to those of the examples were observed after using a mixed resin of thermoplastic resin and aromatic nylon which is a conventional technique.

Specifically, the magnetic compound was produced in the same manner as example 1, except that a metal magnetic powder not surface-treated with phthalic acid was used instead of the magnetic powder composite, and a mixture of the JURAFIDE® (PPS/polyphenylene sulfide resin manufactured by Polyplastics Corporation "A0220A9", V6 melt viscosity of 80 Pa·s) and aromatic nylon 6T Vestamid (registered trademark) (HTplus M1000 manufactured by Daicel-Evonik KK) was used as the resin.

Comparative Example 3

In this example, the magnetic compound was produced in the same manner as comparative example 2, except that a metal magnetic powder not surface-treated with phthalic acid was used instead of the magnetic powder composite.

Comparative Example 4

In this example, the magnetic compound was produced in the same manner as comparative example 3, except that the addition amount of the metal magnetic powder not surface-treated with phthalic acid in comparative example 2 was changed to an amount corresponding to 24 vol %, and an addition amount of the polyphenylene sulfide resin and an addition amount of the fibrous reinforcement are adjusted to the addition amount of comparative example 3.

In comparative examples 1 to 4, during preparation of the kneaded product, the metal magnetic powder is ignited in a stage when the kneaded matter is discharged from the extruder die, thereby generating smoke, and therefore it was impossible to prepare a magnetic compound pellet from the beginning.

TABLE 1

| | Composition of magnetic compound | | | | | Strength of magnetic compound | |
|---|---|---|---|---|---|---|---|
| | Magnetic powder composite | | | | Melt- | Bending | Bend elastic |
| | Metal magnetic powder | Phthalic acid or a derivative thereof | PPS resin | Fibrous reinforcing agent | kneading property | strength (MPa) | modulus (MPa) |
| Example 1 | 27.5 vol % 59 wt % | 5.5 vol % 3 wt % | 47.5 vol % 21.5 wt % | 19.5 vol % 16.5 wt % | o | 97 | 20700 |
| Example 2 | 24 vol % 54 wt % | 5 vol % 3 wt % | 47 vol % 22 wt % | 24 vol % 21 wt % | o | 104 | 20200 |

| | Magnetic permeability of the magnetic compound (2 GHz) | | | Dielectric constant of the magnetic compound (2 GHz) | | |
|---|---|---|---|---|---|---|
| | μ' | μ" | tanδμ | ε' | ε" | tanδε |
| Example 1 | 1.84 | 0.057 | 0.031 | 7.69 | 0.129 | 0.017 |
| Example 2 | 1.70 | 0.042 | 0.025 | 7.15 | 0.117 | 0.016 |

(Note)
Melt-kneading property: o indicates that kneading was possible without causing ignition during discharge.

TABLE 2

| | Composition of magnetic compound | | | | Melt-kneading property | Strength of magnetic compound | |
|---|---|---|---|---|---|---|---|
| | Magnetic powder composite | | PPS resin + PAGT resin | Fibrous reinforcing agent | | Bending strength (MPa) | Bend elastic modulus (MPa) |
| | Metal magnetic powder | Phthalic acid or a derivative thereof | | | | | |
| Comparative example 1 | 27.5 vol %<br>59 wt % | 0 vol %<br>0 wt % | (53 + 0) vol %<br>(24.5 + 0) wt % | 19.5 vol %<br>16.5 wt % | x (Ignited) | — | — |
| Comparative example 2 | 27.5 vol %<br>59 wt % | 0 vol %<br>0 wt % | (45.5 + 7.5) vol %<br>(21 + 3) wt % | 19.5 vol %<br>17 wt % | x (Ignited) | — | — |
| Comparative example 3 | 24 vol %<br>54 wt % | 0 vol %<br>0 wt % | (52 + 0) vol %<br>(25 + 0) wt % | 24 vol %<br>21 wt % | x (Ignited) | — | — |
| Comparative example 4 | 24 vol %<br>54 wt % | 0 vol %<br>0 wt % | (45 + 7) vol %<br>(21.5 + 3) wt % | 24 vol %<br>21.5 wt % | x (Ignited) | — | — |

| | Magnetic permeability of the magnetic compound (2 GHz) | | | Dielectric constant of the magnetic compound (2 GHz) | | |
|---|---|---|---|---|---|---|
| | $\mu'$ | $\mu''$ | $\tan\delta\mu$ | $\varepsilon'$ | $\varepsilon''$ | $\tan\delta\varepsilon$ |
| Comparative example 1 | — | — | — | — | — | — |
| Comparative example 2 | — | — | — | — | — | — |
| Comparative example 3 | — | — | — | — | — | — |
| Comparative example 4 | — | — | — | — | — | — |

(Note)
Melt-kneading property: x (Ignition) indicates that ignition occurs during discharge and the magnetic compound was burned out and it was not obtained.

<Result>

When referring to the abovementioned each table, it is found that all values are satisfactory in each example, regarding the real part ($\mu'$) of the magnetic permeability, the imaginary part ($\mu''$) of the magnetic permeability, the real part ($\varepsilon'$) of the dielectric constant and the imaginary part ($\varepsilon''$) of the dielectric constant at all frequencies described in each table.

On the other hand, in comparative example, burning occurs due to ignition of the metal magnetic powder in the stage when the metal magnetic powder is mixed into the resin to produce the magnetic compound, and the magnetic compound could not be produced.

As a result thereof, according to the abovementioned examples, it becomes clear that a magnetic compound excellent in high frequency properties and excellent in mechanical strength, and its related items can be provided, using the polyarylene sulfide resin.

When an antenna is constituted by a magnetic compound in which metal magnetic powder is mixed in resin, the antenna itself can be miniaturized due to wavelength shortening effect, thereby further contributing to miniaturization of portable devices and smartphones. It is found that application to antennas, radio wave shielding materials, inductors and the like, is also possible.

The invention claimed is:

1. A magnetic compound, consisting of:
   a magnetic powder composite in which at least a part of a surface of a metal magnetic powder is coated with phthalic acid; and
   polyarylene sulfide resin,
   wherein the magnetic powder composite is dispersed in the polyarylene sulfide resin as a matrix.

2. The magnetic compound according to claim 1, wherein when the magnetic compound is constituted so that a content of the metal magnetic powder in the magnetic compound is 27.5 vol %, a real part $\mu'$ of permeability at a measuring frequency of 2 GHz is 1.5 or more, and $\tan\delta\mu$ and $\tan\delta\varepsilon$ are 0.05 or less.

3. An antenna constituted by the magnetic compound according to claim 1.

4. An antenna constituted by the magnetic compound according to claim 2.

5. The magnetic compound according to claim 1, wherein a coating amount of the phthalic acid in the magnetic powder composite is set so that mass of carbon calculated as a carbon measurement value in a high frequency combustion method is in a range of 0.1 wt % to 10 wt % with respect to a total weight of the magnetic powder composite.

* * * * *